Sept. 18, 1923.
H. E. BRIGGS
DISPENSING APPARATUS
Filed Oct. 21, 1921  3 Sheets-Sheet 3
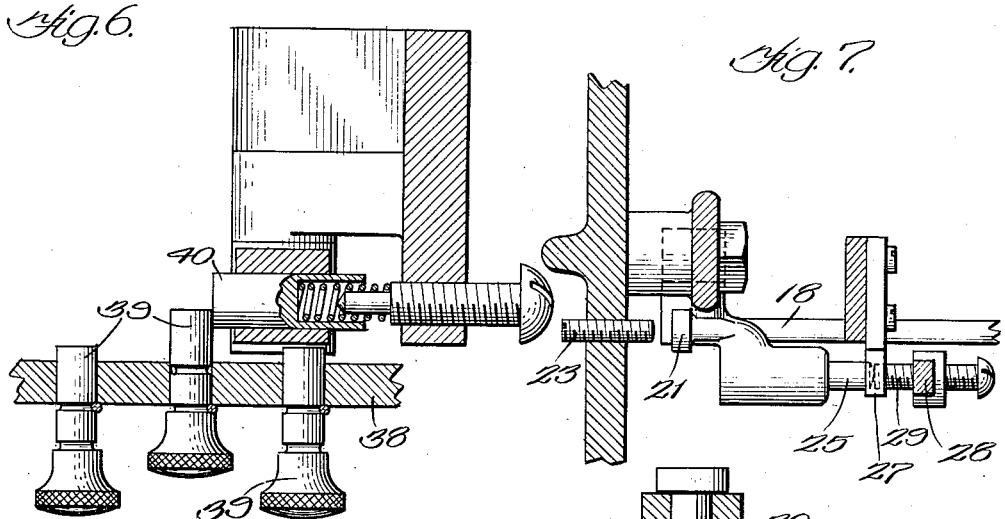
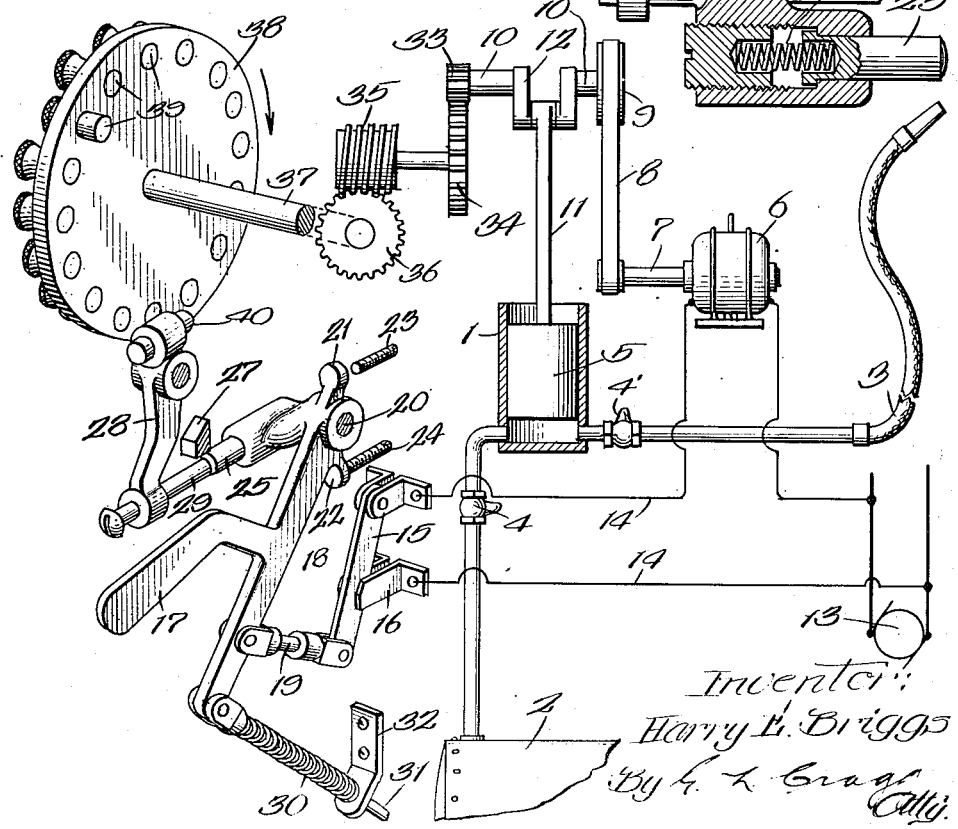

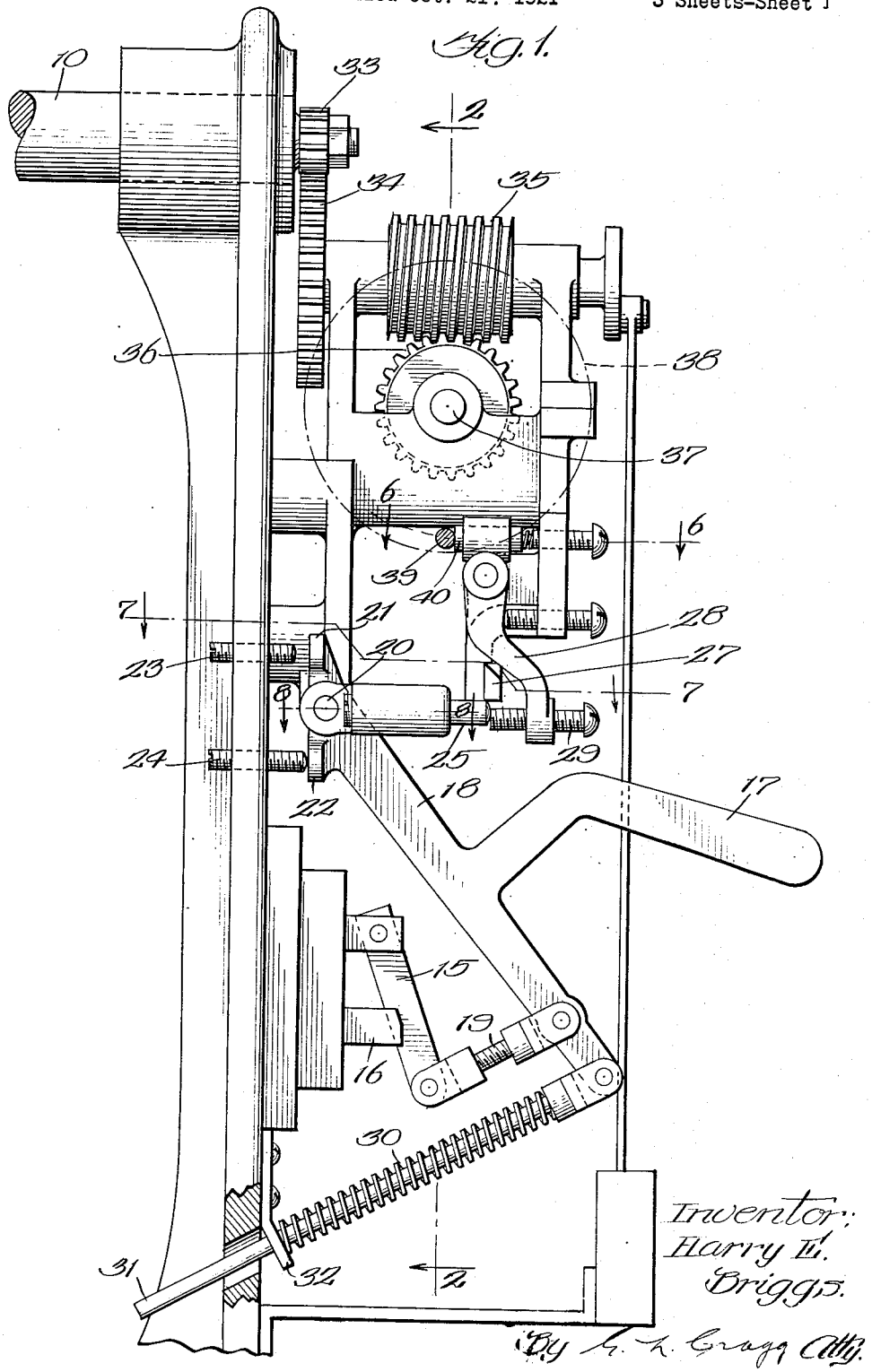

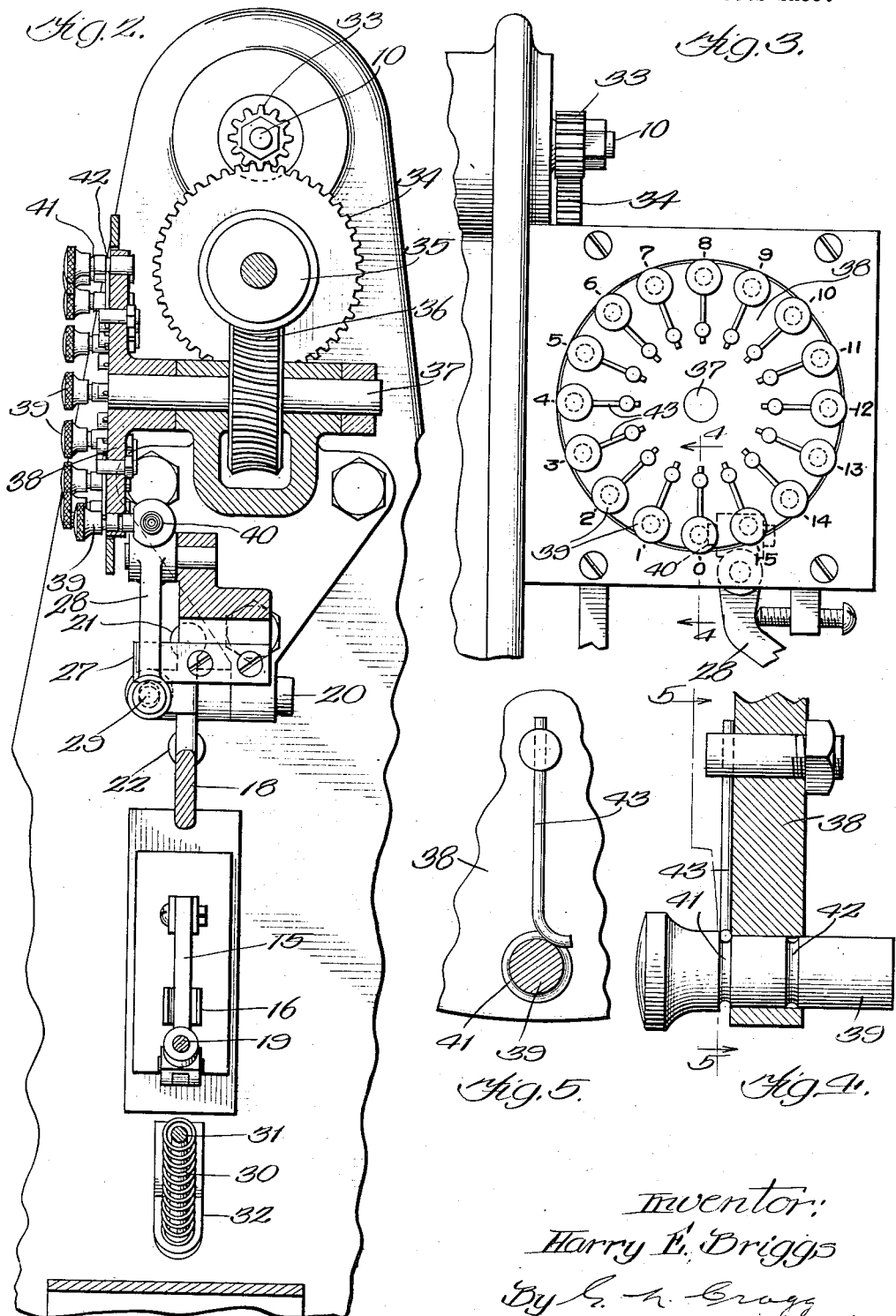

Patented Sept. 18, 1923.

1,468,275

UNITED STATES PATENT OFFICE.

HARRY E. BRIGGS, OF ANDERSON, INDIANA.

DISPENSING APPARATUS.

Application filed October 21, 1921. Serial No. 509,401.

*To all whom it may concern:*

Be it known that I, HARRY E. BRIGGS, citizen of the United States, residing at Anderson, in the county of Madison and State of Indiana, have invented a certain new and useful Improvement in Dispensing Apparatus, of which the following is a full, clear, concise, and exact description.

My invention relates to dispensing apparatus and is of particular service in delivering measured quantities of liquid fuel, such as gasoline, though the invention is not to be limited to any particular use to which it may be put.

The apparatus of my invention includes a motor, a feeding device operated by the motor, and mechanism controlling the extent of operation of the motor and itself operated by the motor. When the apparatus is employed for dispensing fluids the feeding device is in the form of a pump preferably of the reciprocating type, that discharges a measured quantity of the fluid in each cycle of its operation. The motor is desirably an electric motor, the mechanism that controls the extent of operation of the motor being then inclusive of an electric switch that is employed to place the motor in and out of circuit. This electric switch is preferably manually operated in order to close it, the switch being held closed by a suitable stop that is deprived of its function when the predetermined quantity of fluid has been pumped, the mechanism for depriving such stop of its function being operated by the motor. The mechanism that is operated by the motor for discontinuing the influence of the stop is made adjustable so as to vary the duration of operation of the pump according to the quantity of fluid desired.

I will explain my invention more fully by reference to the accompanying drawings in which Fig. 1 is a front view with a portion of the equipment removed to reveal parts that would otherwise be hidden; Fig. 2 is a sectional view on line 2—2 of Fig. 1; Fig. 3 is a front view of a part of the structure whose illustration is omitted in Fig. 1; Fig. 4 is a sectional view on line 4—4 of Fig. 3; Fig. 5 is a sectional view on line 5—5 of Fig. 4; Figs. 6, 7 and 8 are sectional views respectively taken on lines 6—6, 7—7 and 8—8 of Fig. 1; and Fig. 9 is a diagrammatic view of the apparatus.

Like parts are indicated by similar characters of reference throughout the different figures.

The apparatus illustrated being one that is adapted to the dispensing of liquid, there is employed a pump 1, preferably of the reciprocating type, that serves to transfer liquid, such as gasoline, from a suitable supply tank 2 to the flexible discharge hose 3, there being a check valve 4 to permit withdrawal of the liquid from the tank on the outward stroke of the pump piston 5 and to prevent the return of the liquid to the tank on the return stroke of the piston, during which return stroke the liquid is to be forced through the discharge hose 3. Another check valve 4' is interposed between the pump and the discharge hose 3 in order to insure the self-measuring aspect of the apparatus. A plurality of operations of the pump serves to effect the delivery of a gallon of the liquid. The pump is preferably driven by an electric motor 6 that is in driving connection with the pump through any suitable power transmission mechanism such as the pulley 7 upon the motor shaft, a belt 8 surrounding this pulley, the pulley 9, the crank shaft 10 carrying the latter pulley and the pitman 11 coupling the crank 12 with the piston 5. The motor may be operated by current furnished from any suitable source, Fig. 9 digrammatically illustrating a source of direct current 13. The motor is connected in a bridge 14 across the generator mains, this bridge including in its circuit a pivotally mounted switch blade 15 and a contact 16 with which the switch blade is in separable engagement. The switch blade may be thrown into engagement with its contact 16 by depressing movement of the handle 17 that is carried upon the handle lever 18 which is connected with the free end of the switch blade 15 by a link 19. The lever 18 is pivoted upon the shaft 20 and carries two ear formations 21, 22 that are respectively engageable with stops 23, 24 that define the range of swinging movement of said lever. The pivoted end of the lever is enlarged and forwardly extended to receive the plunger 25 that is outwardly pressed upon by a spring 26 that places the plunger in its outermost position when the switch is closed, at which time the plunger underlies a stop 27 whereby the switch is maintained closed until it is automatically opened as will hereinafter appear. At the conclusion of the predetermined operation of the pump the motor operates an intermediately pivoted lever 28, through the intermediation of mechanism hereinafter to be described, such lever, in its operation, pressing the post or finger 29 against the plunger 25 and depressing this plunger against the force of the spring 26 to remove the plunger from beneath the stop 27 whereupon the switch opening spring 30 is permitted to open the switch, the plunger being maintained in its depressed adjustment by having its outer end engaging the opposing face of the stop 27.

The switch opening spring 30 is suitably associated with the switch lever 18. As illustrated, this spring surrounds the rod 31 that is guided in its movement by an eye 32 through which one end of the rod passes, the other end of the rod being pivotally connected with the outer end of the lever 18.

The mechanism whereby the motor may operate upon the plunger 25 when the pump 5 has been sufficiently operated is preferably inclusive of a spur pinion 33 upon the crank shaft 10, a spur gear 34 in mesh with the pinion, a worm 35 co-axial with and fixed with respect to the gear 34, a worm wheel 36 in mesh with the worm 35, a shaft 37 carrying the worm wheel 36, a disc 38 co-axial with and fixed upon the shaft 37 and the selected one of a number of buttons 39 that are adjustable into and out of the plane of the lever 28. When any such button is adjusted into the plane of the lever it is ultimately brought into engagement with a post 40 carried upon one end of the lever 28 opposite the end that carries the post 29. The buttons are arranged in a circle that is concentric with the disc 38 and its shaft 37. The buttons are desirably equidistantly spaced, the space between any two adjacent buttons corresponding to a gallon. When the switch is closed the post 40 is spaced apart from the first button that could be engaged with it a distance corresponding to one gallon. If this button happens to be adjusted into the plane of the lever the pump will be permitted to pump one gallon before such button engages the post 40 to open the switch. If the button in the second space from the post 40 is the one that is thrown into the path of the lever 28 the pump will pump two gallons before it is stopped, etc. The drawings illustrate 16 buttons which permit the apparatus to be adjusted so that its pump may supply from one to fifteen gallons according to its adjustment.

As illustrated in Figs. 4 and 5, the shank of each button has two annular grooves 41, 42 and the disc carries a spring detent 43 for each button, the unmounted end of each detent being engageable with one or the other of the grooves 41, 42 according to the adjustment of the corresponding button into or out of the plane of the lever 28. When a detent 43 engages the groove 41 in the corresponding button, such button is held in the plane of the lever 28 and when the companion groove 42 is thus engaged the button is held withdrawn from the plane of the lever.

The fluid furnished by the pump may be passed directly to the discharge tube 3 or it may be placed in a visual container in the process of its discharge for the satisfaction of the consumer.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination of a manually operable switch; a spring pressed plunger connected with the switch; a stop engageable by the outer end of the plunger to hold the switch in closed position, said plunger being engageable beneath the stop to hold the switch in a closed position; a spring for exerting opening movement upon the switch and against the force of which the switch is manually closed; a lever for depressing the aforesaid plunger to permit the aforesaid spring to open the switch; a rotatable disc; and a plurality of buttons carried by the disk, each adjustable into and out of the range of said lever and serving when in the range of the lever to operate it when the disc is turned.

2. The combination of a manually operable switch; a spring pressed plunger connected with the switch; a stop with and beneath which said plunger is engageable to hold the switch in a closed position; a spring for exerting opening movement upon the switch and against the force of which the switch is manually closed; a lever for depressing the aforesaid plunger out of engagement with said stop to permit the aforesaid spring to open the switch; a rotatable disc; and a plurality of buttons carried by the disk each adjustable into and out of the range of said lever and serving when in the range of the lever to operate it when the disc is turned.

3. The combination of a manually operable switch; a stop engaged by a movable member of the switch, when closed, and serving to hold the switch in closed position; a lever for breaking the holding engagement between said stop and switch; a spring for exerting opening movement of the switch and against the force of which the switch is manually closed; a rotatable disc; and a plurality of buttons carried by the disk each adjustable into and out of the range of said lever and serving when in the range of the lever to operate it when the disc is turned.

4. The combination of a manually operable switch; a spring pressed plunger carried by a movable member of the switch; a stop engageable by the outer end of the plunger to hold the switch in closed position, said plunger being engageable beneath the stop to hold the switch in a closed position; a spring for exerting opening movement upon the switch and against the force of which the switch is manually closed; motion transmitting means for depressing the aforesaid plunger to permit the aforesaid spring to open the switch; and mechanism for operating the aforesaid motion transmitting means.

5. The combination of a manually operable switch; a spring pressed plunger connected with the switch; a stop engageable by the outer end of the plunger to hold the switch in closed position, said plunger being engageable beneath the stop to hold the switch in a closed position; a spring for exerting opening movement upon the switch and against the force of which the switch is manually closed; motion transmitting means for depressing the aforesaid plunger to permit the aforesaid spring to open the switch; and mechanism for operating the aforesaid motion transmitting means, this mechanism being adjustable with respect to said motion transmitting means to vary the duration of the closure of the switch.

In witness whereof, I hereunto subscribe my name this 17 day of September A. D., 1921.

HARRY E. BRIGGS.